United States Patent
Chien et al.

(10) Patent No.: US 6,891,832 B1
(45) Date of Patent: May 10, 2005

(54) ADAPTIVE FRAGMENTATION TECHNIQUES IMPLEMENTED ON A DATA NETWORK

(75) Inventors: Ming-Chin Chien, San Jose, CA (US); Gregory A. Fowler, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 921 days.

(21) Appl. No.: 09/663,247

(22) Filed: Sep. 15, 2000

(51) Int. Cl.⁷ .............................................. H04L 12/28
(52) U.S. Cl. .................... 370/395.1; 370/465; 370/473; 370/474
(58) Field of Search ......................... 370/465, 469–474, 370/395.1, 395.5, 395.52, 229, 230, 231, 235, 389, 394, 401, 352, 476

(56) References Cited

U.S. PATENT DOCUMENTS

| | | | | |
|---|---|---|---|---|
| 6,160,808 A | * | 12/2000 | Maurya | 370/389 |
| 6,430,196 B1 | * | 8/2002 | Baroudi | 370/466 |
| 6,707,799 B1 | * | 3/2004 | Chui | 370/282 |
| 6,785,239 B1 | * | 8/2004 | Tasker | 370/238 |

OTHER PUBLICATIONS

AF–SAA–0109.000, Multi–service Extension to FUNI v2.0 Specification, pp. 2–14, Feb. 1999.*
Bormann, The Multi–Class Extension to Multi–Link PPP, RFC 2686, pp. 1–11, Sep. 1999.*
Andrew G. Malis, , "Frame Relay Fragmentation Implementation Agreement", FRF.12, Frame Relay Forum Technical Committee, Apr. 2000 pp. 1–18.
Sklower, et al, "The PPP Multilink Protocol (MP)," RFC 1990, Network Working Group, Aug. 1996, pp. 1–24.

* cited by examiner

Primary Examiner—Frank Duong
(74) Attorney, Agent, or Firm—Beyer, Weaver & Thomas, LLP.; Dean E. Wolf, Esq.

(57) ABSTRACT

At least one technique is disclosed for improving the efficiency of fragmentation techniques currently implemented in conventional data networks. According to a specific embodiments, fragmentation may be automatically and dynamically enabled on a particular link at times when there is real-time traffic being carried over that link. At times when there is no real-time traffic being carried over the link, fragmentation may be automatically and dynamically disabled or significantly reduced. In this way, the technique of the present invention may be used to improve the efficiency data networks.

64 Claims, 5 Drawing Sheets

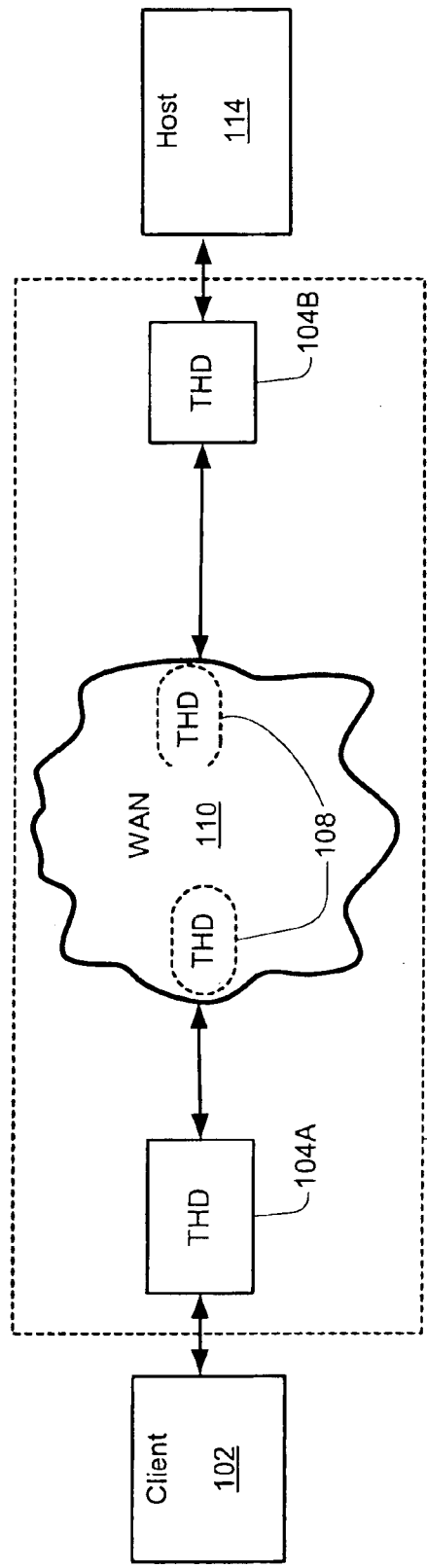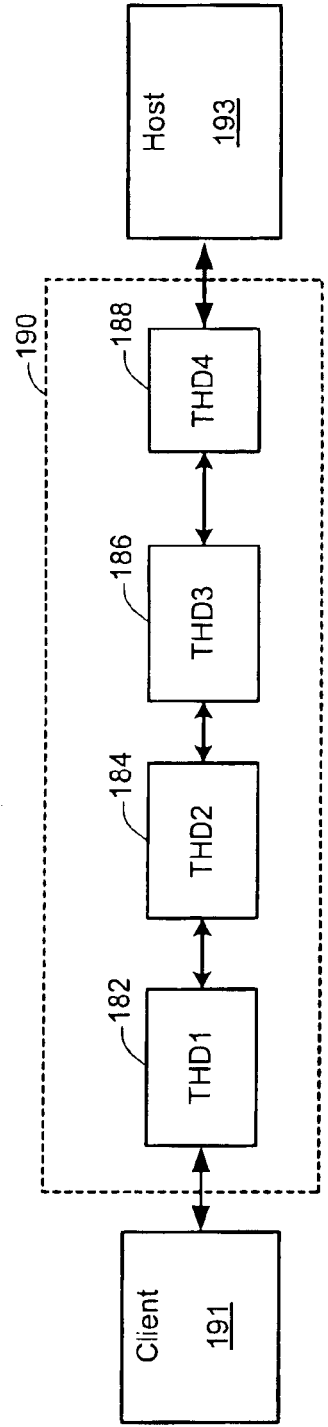
Fig. 1A (prior art)
Fig. 1B

ADAPTIVE FRAGMENTATION TECHNIQUES IMPLEMENTED ON A DATA NETWORK

BACKGROUND OF THE INVENTION

The present invention relates generally to data networks, and more particularly to adaptive fragmentation techniques to be implemented over data networks.

The merging of computers and communications has had a profound influence on the way computer systems are organized. As computer technology advances, the role of computer networks steadily increases. Various types of computer networks include internetworks (e.g., the Internet), local area networks (LANs), metropolitan area networks (MANs), and wide area networks (WANs).

The use of networks such as LANs or WANs allows data or other information to be exchanged over large distances at a reasonable speed, and at relatively low cost. Although conventional network systems are advantageous for a variety of reasons, implementing and maintaining such networks presents an ongoing problem. Moreover, a network may span a plurality of separate LANs and/or WANs to create the impression of a unified network. This has greatly complicated the implementation, maintenance, and control of system parameters within the network.

FIG. 1A shows an example of a link 100 which forms part of a data network. The link 100 may comprise a physical or virtual circuit (e.g. Frame Relay circuit, Multilink PPP circuit, etc.) which provides a dedicated communication path between host device 114 and client device 102. For example, the link 100 may comprise at least one Frame Relay virtual circuit for transmitting data between client system 102 and host system 114. A Frame Relay virtual circuit represents a high-speed packet switching path used in wide area networks. Its use has become very popular for LAN-to-LAN connections across remote distances. A consumer may lease a Frame Relay virtual circuit between two points and send packets of information between the two points. It is also possible to lease Frame Relay circuits between a given site and multiple other sites.

As shown in FIG. 1A, the link 100 comprises a plurality of individual network elements or devices (e.g., 104A, 104B, 108) which are part of a wide area network (WAN) 150. In the example of FIG. 1, network devices 104A, 104B, and 108 each correspond to a respective traffic handling device (THD), such as, for example, a router or switch, that is part of the wide area network 150 and used to form link 100. Each of the traffic handling devices 104A, 104B are typically statically configured by a system administrator using a command line interface (CLI) via a local console (not shown). The virtual circuit between THD 104A and THD 104B is provided by a WAN cloud network 110. The WAN cloud may include a plurality of THDs (108) which are statically configured by a system administrator to provide virtual circuits.

Typically, different portions of the wide area network 150 are owned and/or managed by separate entities. For example, a service provider may manage or control the gateways (104A, 104B) for accessing the wide area network from either the client machine 102 or host machine 114. Alternatively, the gateways may be managed and/or controlled by the end user. Further, the WAN cloud 110 may be managed or controlled by a separate entity such as, for example, a data network company (e.g., AT&T, MCI, Sprint, etc.). Additionally, it will be appreciated that most operating parameters of conventional traffic handling devices (such as those shown in FIG. 1A) are typically derived from static on-board configurations having minimal, if any, interaction with the provisioning switching devices in the network and no interaction with the far end devices that terminate the circuit.

An alternate embodiment of the link 100 of FIG. 1A is shown in FIG. 1B. FIG. 1B shows a schematic block diagram of a specific embodiment of link 190 which may be used for implementing the adaptive fragmentation technique of the present invention. In the example of FIG. 1B, link 190 comprises a plurality of traffic handling devices (THDs) which collectively provide a dedicated communication path between host device 193 and client device 191. The plurality of THDs of link 190 comprise two "edge" traffic handling devices THD1, THD4 (182, 188), and comprise two "interior" traffic handling devices THD2, THD3 (184, 186).

Network Traffic

As explained above, there currently exists a variety of different types of data networks which may be used for transmitting data between users at different geographic locations. Each of network may be configured to transmit data in accordance with different protocols such as, for example, Frame Relay, ATM, ISDN, TCP/IP, Multilink PPP, etc. Moreover, the rate of data transmission across each of these networks may vary depending upon different system perimeters such as, for example, available bandwidth, Quality of Service, etc. Furthermore, each of these data networks may be used to carry or transmit a variety of different types of traffic including, for example, real-time traffic, and non-real-time traffic. Real-time traffic generally refers to time critical traffic such as, for example, voice traffic, video traffic, audio traffic, etc. Non-real-time traffic generally refers to non-time critical traffic such as, for example, data traffic.

Typically, when both real-time traffic and non-real-time are carried across a relatively low speed link (e.g. links that have a data transmission speed of less than 400K bits per second), relatively long non-real-time packets (e.g. long data packets) need to be fragmented into a sequence of shorter frames in order to control delay and delay variation for real-time traffic carried across that link. In the context of this application, a network link refers to any communication path which may exist between two network devices such as, for example, a virtual circuit, a physical interface, a multi link PPP session, etc.

For example, assuming that a particular network link is used for carrying both real-time and non-real-time traffic and that the network link has a data transmission speed of 64K bits per second, if it is desired to transmit a data packet of 12K bits without using fragmentation, then approximately 200 milliseconds would be required for transmitting the data packet across this link. Such a transmission delay would be undesirable in many of today's data networks, particularly in networks which are used for real-time data communication.

For this reason, many conventional data transmission protocols have adopted a standard of setting a maximum allowable transmission delay between link in a network such as, for example, 150 milliseconds. Accordingly, in networks which have adopted this standard, fragmentation may be used in order to fragment long data packets into a sequence of shorter frames to control delay and delay variation, particularly for a real-time traffic.

Currently, there are a variety of standards which specify how to implement fragmentation for different transmission protocols. One such standard is the Frame Relay Fragmentation Implementation Agreement (FRF.12), by Andrew G.

Malis, published by the Frame Relay Forum of Fremont, Calif., 1997, incorporated herein by reference in its entirety for all purposes. Another standard is the PPP Multi Link Protocol, set forth in RFC Document No. 1717 (IETF, Sklower, et al., November 1994), incorporated herein by reference in its entirety for all purposes. There are also a number of other standards for implementing fragmentation in networks which use different transmission protocols such as, for example, ATM, DOCSIS, TCP/IP, SONNET, etc.

Typically, in most conventional networks which implement fragmentation, the service provider or network manager manually configures the maximum allowable fragmentation size on each link of the network. This information is typically stored in a configuration file on each of the network devices. After being reset, or upon initialization, each network device uses the information from its configuration file to statically configure itself to implement fragmentation for any traffic which exceeds the maximum allowable fragmentation size (MAX_FRAG).

One disadvantage of fragmentation is that it consumes a significant portion of network resources, including CPU power of each network device. Another disadvantage of conventional techniques for implementing fragmentation is that, once fragmentation is enabled on a particular link, it will remain enabled, and will further remain statically configured to fragment packets which have a size greater than the MAX_FRAG_SIZE regardless of whether or not there is any real-time traffic currently being carried on that link. A further disadvantage of fragmentation is that its use increases the amount of overhead needed for routing, switching, or forwarding traffic at a particular network device.

Thus, it will be appreciated that many conventional fragmentation techniques are not efficient. In light of the above, there is a continual need to improve upon techniques for transmitting information in data networks which carry both real-time and non-real-time data.

SUMMARY OF THE INVENTION

According to specific embodiments of the present invention, a method and computer program product are disclosed for providing adaptive fragmentation on at least one link of a data network. At least one condition on a selected link may be monitored by a network device. Fragmentation on the link may then be automatically enabled upon detecting the occurrence of a first condition on the link. According to a specific embodiment, the first condition may relate to the detection of real-time traffic being carried over the link. Additionally, fragmentation on the link may be automatically disabled in response to detecting the occurrence of a second condition on the link. According to a specific embodiment, the second condition may relate to the absence of real-time traffic being transported over the link for at least a predetermined time interval T. In accordance with at least one embodiment, the technique of the present invention provides for adaptive fragmentation on selected network links whereby fragmentation on a link may be dynamically enabled or disabled depending upon whether any real-time traffic is being transported over the link.

In accordance with at least one embodiment of the present invention, fragmentation on a selected link may be disabled in the absence of real-time traffic being transported on that link. In this way, the non-real-time traffic will not be penalized by unnecessary fragmentation, thereby resulting in improved network performance. Further, according to a specific embodiment, whenever real-time traffic is detected on the link, fragmentation may be automatically enabled in order to assure the quality of real-time traffic transport.

According to another embodiment of the present invention, fragmentation on a particular link may be automatically enabled in response to detecting an external real-time set-up signal for establishing at least one real-time connection on the link. Additionally, fragmentation may be automatically disabled in response to determining that no real-time connections are currently established on the link.

According to another embodiment of the present invention, a selected network link may be configured to include a dynamically adjustable fragmentation size value relating to a preferred fragmentation size of packets to be transported on that link such that fragmentation will be performed on selected packets which have a size greater than the fragmentation size value. The fragmentation size value may then be automatically adjusted in response to detecting real-time traffic being transported on the link to thereby cause fragmentation to effectively be enabled on the link. Additionally, according to a specific implementation, the fragmentation size value on the link may be increased over time as long as no real-time traffic is detected on the link. In this way, the use of fragmentation on the link may gradually be decreased over time in the absence of real-time traffic being transported on the link.

An alternate embodiment of the present invention is directed to a network device for transmitting information over a link in a data network. The network device comprises at least one CPU, memory, and at least one interface adapted to communicate with other network devices via the link. The network device is configured or designed to monitor conditions on the link and is further configured or designed to automatically enable fragmentation on the link upon detecting the presence of real-time traffic being transported over the link. The network device may further be configured or designed to automatically disable fragmentation on the link in response to detecting the absence of real-time traffic on the link for at least a predetermined time interval T.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1A shows an example of a link 100 which forms part of a data network.

FIG. 1B shows a schematic block diagram of a specific embodiment of link 190 which may be used for implementing the adaptive fragmentation technique of the present invention

DETAILED DESCRIPTION OF THE PREFERRED EMBODIMENTS

Generally, the technique of the present invention may be used to improve the efficiency of fragmentation techniques currently implemented in many of today's data networks. According to a specific embodiment, fragmentation may be enabled on a particular link at times when there is real-time traffic being carried over that link. However, at times when there is no real-time traffic being carried over the link, fragmentation may be disabled or significantly reduced. In this way, the technique of the present invention may be used to improve the efficiency data networks, such as, for example, by reducing the costs associated with implementing fragmentation on one or more links in the network. Moreover, the adaptive fragmentation technique of the present invention may be used to implement automatic and dynamic reconfiguration of fragmentation parameters (e.g., MAX_FRAG_SIZE, fragmentation enabled, fragmentation disabled, etc.) on one or more selected links of the data network.

Figure 2:
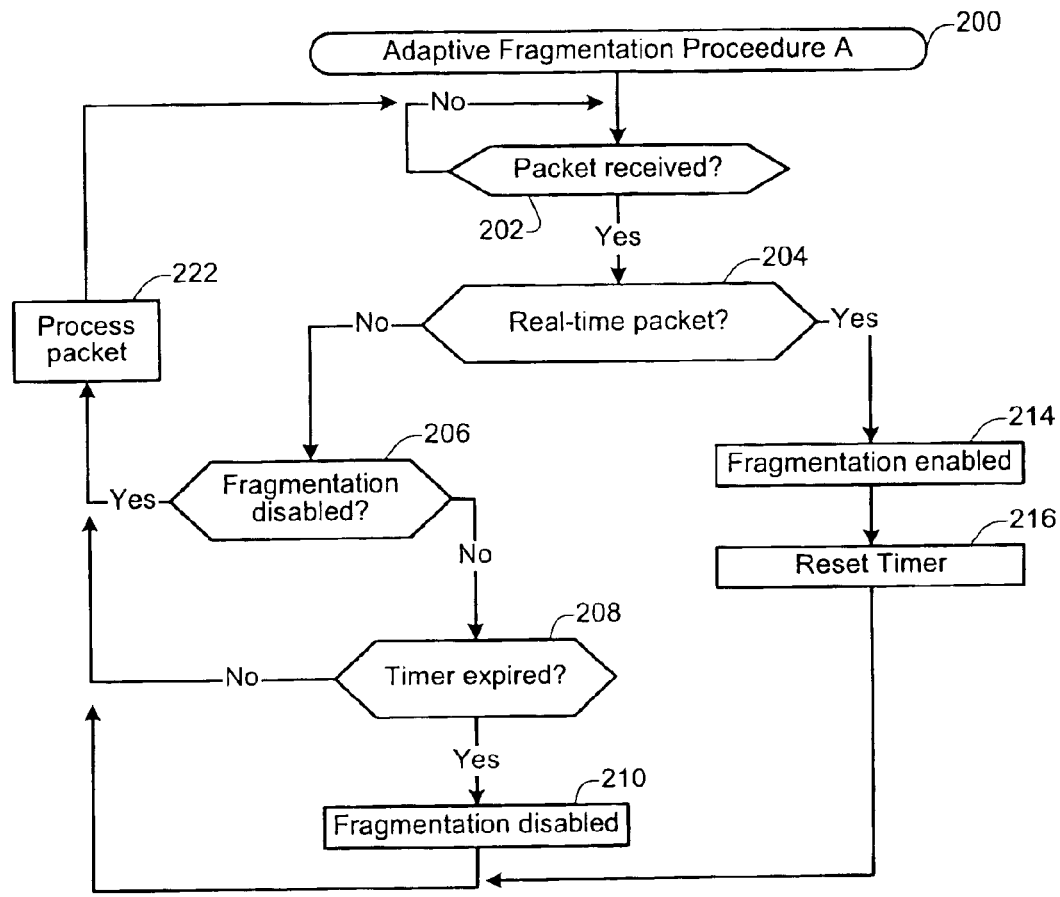
FIG. 2 shows a flow diagram of an Adaptive Fragmentation Procedure A 200 in accordance with a specific embodiment of the present invention.

FIG. 2 shows a flow diagram of an Adaptive Fragmentation Procedure A 200 in accordance with a specific embodiment of the present invention. According to a specific implementation, a separate thread of the Adaptive Fragmentation Procedure A may be implemented for each link or selected links which are handled by that network device. Further, according to a specific implementation, a separate thread of the Adaptive Fragmentation Procedure A may be implemented for each link or selected links which are handled by a given network device. For example, the Adaptive Fragmentation Procedure A may be implemented at one or more traffic handling devices (e.g., 104A, 104B, 108) which form a link or virtual link 150 between client system 102 and server system 114. In the example of FIG. 2, it is assumed that the Adaptive Fragmentation Procedure A 200 is implemented at traffic handling device (THD) 104A (FIG. 1A), which shall be referred to as the "network device."

Generally, the Adaptive Fragmentation Procedure A describes an adaptive fragmentation technique which may be used to enable or disable fragmentation on a given link based on a predetermined time interval T. As described in greater detail below, if, during a predetermined time interval T, no real-time traffic has been transported on a selected link, then fragmentation may be disabled on that link. Whenever real-time traffic is detected on the link, fragmentation may be immediately enabled. According to a specific embodiment, the value of the predetermined time interval T may be configurable and may depend one or more parameters specific to the data network implementing the present inventive technique. According to a specific implementation, the value of the predetermined time interval T may range, for example, from a few milliseconds to several minutes. According to one implementation, the value of the predetermined time interval T may be set equal to a value ranging from 60 seconds to 180 seconds.

As shown at 202 of FIG. 2, the network device waits to receive a packet. Once a packet has been received, the network device then determines (204) whether the received packet is associated with real-time traffic or a non-real-time traffic. According to a specific embodiment, the network device may make this determination by examining the packet header. According to other embodiments, the network device may make this determination by monitoring one or more interfaces where packets are received.

If it is determined that the received packet is a non-real-time packet, then the network device next determines (206) whether fragmentation has been disabled on the link associated with the received packet. If it is determined that fragmentation is currently disabled on the identified link, the network device may then process (222) the received packet in accordance with normal traffic handling protocol. Alternatively, if it is determined (at 206) that fragmentation is currently enabled on the identified link, the network device may then consult a specific timer in order to determine (208) whether the predetermined time interval T has expired. According to specific embodiments, the timer may be implemented via software, hardware, or some combination of both software and hardware. Further, according to a specific implementation, the timer is accumulated based upon the system clock.

A primary function of the timer is to measure the time that has elapsed since the network device received a real-time packet. As explained in greater detail below, each time the network device receives a real-time packet on a selected link, the timer may be reset to zero. According to a specific embodiment, each time the timer is reset or restarted, the measurement of the predetermined time interval T starts over. The timer may be configured or designed to expire after having run continuously (e.g. without being reset) for a length of time equal to the value of the predetermined time interval T. Thus, if it is determined (208) that the timer has expired, it may be assumed that no real-time packet has been received at the network device for an amount of time at least equal to the predetermined time interval T. Accordingly, fragmentation may then be disabled (210) on the identified link in order to improve the traffic handling performance of the network device.

If, on the other hand, it is determined (208) that the timer has not expired, then it may be concluded that at least one real-time packet has been received at the network device within the predetermined time interval T. Accordingly, fragmentation may remain enabled in order to ensure that subsequent real-time packets are not significantly delayed by long data packets which would otherwise require fragmentation. Thereafter, the network device may process (222) the received packet in accordance with normal traffic handling procedures.

Returning to block 204, if it is determined that the received packet is a real-time packet, then the network device enables (214) fragmentation on the identified link associated with the received packet (if currently disabled), and resets (216) the timer. Thereafter, the network device processes (222) the packet in accordance with normal traffic handling procedures. For example, the network device may proceed to queue the packet for processing after initiating the Adaptive Fragmentation Procedure A. According to a specific embodiment, the Adaptive Fragmentation Procedure A may be executed or initiated each time a packet is processed by a particular router, switch or other network device.

One advantage of not disabling fragmentation on a selected link until a predetermined time interval T has elapsed is that it helps to reduce transmission delays attributable to long data packets being processed without fragmentation. For example, if fragmentation were to be disabled each time a non-real-time packet is received, this may result in an unacceptable result time for processing subsequent real-time packets, particularly if the non-real-time packet is a relatively long data packet which, if processed without fragmentation, would result in a delay of greater than 150 milliseconds. Thus, by not disabling fragmentation until after a predetermined time interval T has elapsed during which time no real-time packets have been received, the technique of the present invention allows for the anticipation of receiving subsequent real-time packets where at least one real-time packet has been received within the time interval T. This feature is particularly advantageous in networks where traffic patterns and traffic types may vary depending upon the hours of operation of the network. For example, during normal business hours (e.g 9 am to 5 pm) there may be a substantial amount of real-time traffic (e.g. voice traffic) on a particular network link, whereas during non-business hours little, if any, real-time traffic may be carried on that link.

Figure 3:
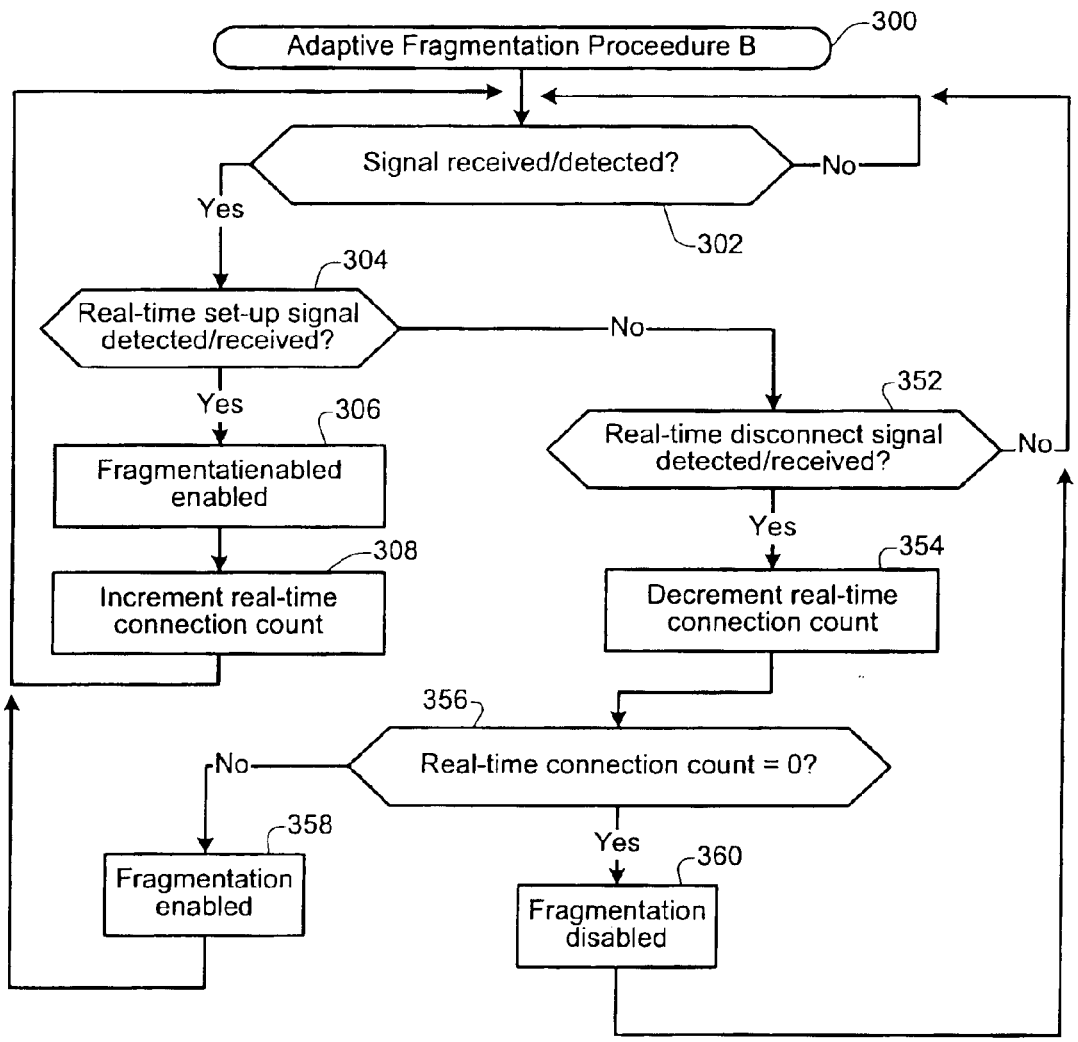
FIG. 3 shows a flow diagram of an Adaptive Fragmentation Procedure B 300 in accordance with a specific embodiment of the present invention.

An alternate embodiment of the adaptive fragmentation technique of the present invention is shown in FIG. 3 of the drawings. FIG. 3 shows a flow diagram of an Adaptive Fragmentation Procedure B 300 in accordance with a specific embodiment of the present invention.

According to the specific embodiment of FIG. 3, fragmentation may be enabled or disabled based upon the presence or absence of real-time sessions on a particular link. Thus, for example, according to a specific implementation, fragmentation will be enabled at times when it is detected that there exists one or more real-time sessions on a particular link. If no real-time sessions are detected on that link, fragmentation may then be disabled.

In a specific implementation, the adaptive fragmentation technique of FIG. 3 uses external signals to control whether fragmentation will be enabled or disabled. For example, fragmentation on a particular link may be enabled in response to detection of a real-time set-up signal on that link such as, for example, an off-hook signal from a telephone, an RSVP reservation signal, and ISDN connect message, an ATM connect or set-up message, a Frame Relay Setup Message, a real-time voice/video bandwidth reservation signal, etc. In this way fragmentation may be automatically and dynamically enabled in appropriate network devices which form part of an end-to-end circuit that has been setup for carrying real-time traffic.

According to a specific implementation, the Adaptive Fragmentation Procedure B may be implemented in the edge network devices of a specific channel or link that has been setup to carry real-time traffic. According to a different implementation, for example, in which the network link supports the well-known RSVP protocol, the Adaptive Fragmentation Procedure B of FIG. 3 may be implemented at each of the network devices which form part of the network link. The RSVP protocol is generally known to one having ordinary skill in the art, and is described in full detail in the reference RFC No. 2205 (IETF, Braden, et al., September 1997), which is incorporated herein by reference in its entirety for all purposes.

In the example of FIG. 3, it is assumed that the Adaptive Fragmentation Procedure B is implemented in a particular network device such as traffic handling device 104A of FIG. 1A of the drawings. At 302 the network device waits for a signal. According to the specific embodiment of FIG. 3, the signal refers to an external signal which is typically generated by a source external to the network device. In an alternate embodiment, the signal may be generated by the network device or a component or subsystem thereof. Upon receiving a signal, the network device then determines (304) whether the detected signal corresponds to a real-time set-up signal, such as those described previously. Presumably, the real-time set-up will correspond to the provisioning of a real-time circuit for transporting real-time traffic over the selected link.

If it is determined that the detected signal corresponds to a real-time set-up signal, then the network device enables (306) fragmentation on the link or channel associated with the real-time set-up signal. Thereafter, the network device increments (308) a real-time connection counter, which may be used to keep track of the number of real-time connections currently being carried on the identified link or channel. In accordance with a specific embodiment, each time a real-time set-up signal is received at the network device, fragmentation will be enabled (if previously disabled), and the real-time connection count value will be incremented.

Returning to block 304 of FIG. 3, if it is determined that the detected signal is not a real-time set-up signal, then the network device determines (352) whether the detected signal corresponds to a real-time disconnect signal. According to at least one embodiment, the real-time disconnect signal may correspond to a variety of different protocol signals which are used to acknowledge disconnection of a real-time circuit that has been set-up to carry real-time traffic. Examples of real-time disconnect signals include an on-hook telephone signal, an RSVP reservation signal, an ISDN disconnect message, an ATM disconnect message, a Frame Relay Disconnect message, etc.

If it is determined that the detected signal corresponds to a real-time disconnect signal, then the network device decrements (354) the real-time count value. Thereafter, the network device determines whether the real-time connection count value is equal to zero. If it is determined that the real-time connection count value is equal to zero, then it may be concluded that there are currently no real-time sessions which exist on the identified or selected link. Accordingly, fragmentation on the identified link may be disabled (360) in order to improve the performance of the network device.

Alternatively, if it is determined that the value of the real-time connection count is greater than zero, then it may be concluded that there currently exists at least one real-time session on the identified link. Accordingly, fragmentation on the identified link is or remains enabled (358) on the selected link.

It will be appreciated that the enabling or disabling of fragmentation need not be performed if the network device determines that the newly desired fragmentation state (e.g. enabled or disabled) is the same as the current fragmentation state of the identified link.

Figure 4:
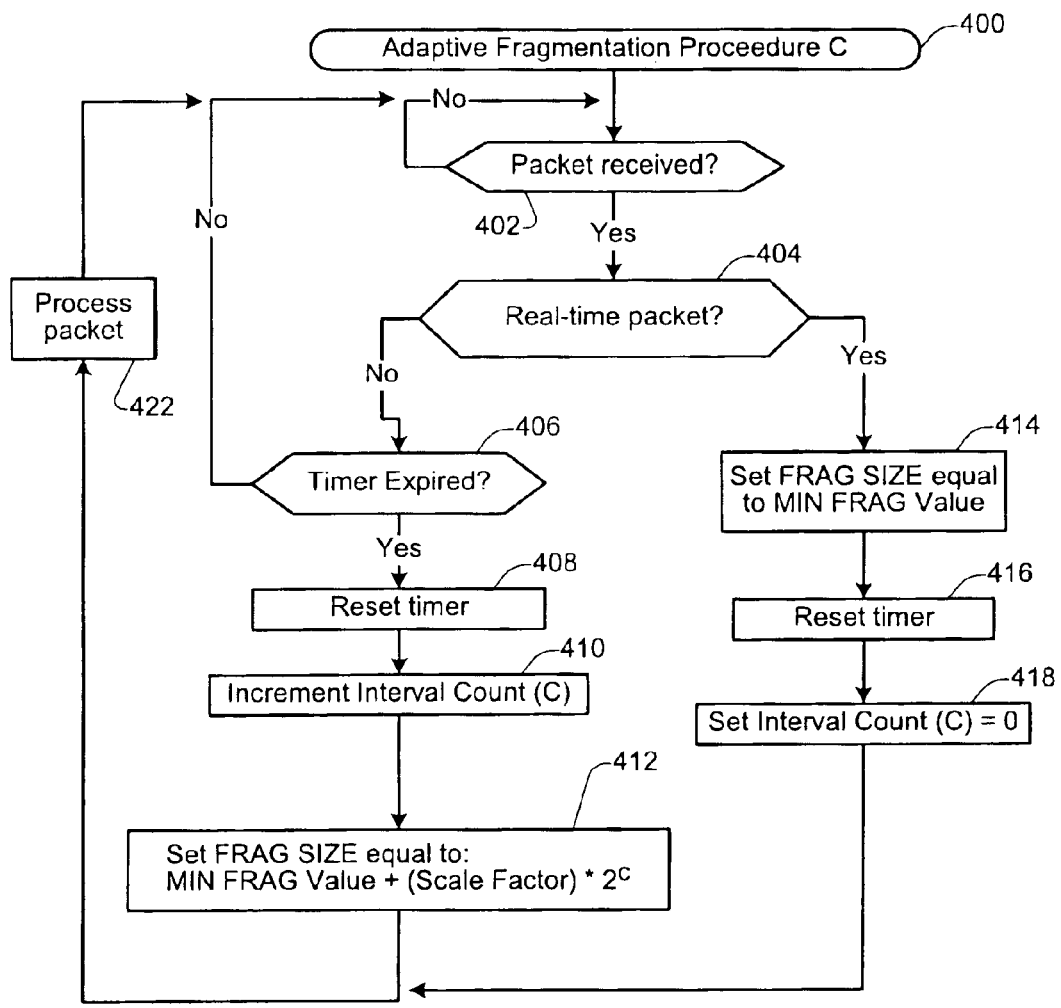
FIG. 4 shows a flow diagram of an Adaptive Fragmentation Procedure C 400 in accordance with a specific embodiment of the present invention.

An alternate embodiment of the adaptive fragmentation technique of the present invention is shown in FIG. 4 of the drawings. FIG. 4 shows a flow diagram of an Adaptive Fragmentation Procedure C 400 in accordance with a specific embodiment of the present invention. Like the embodiment of FIG. 2, the Adaptive Fragmentation Procedure C of FIG. 4 may be implemented by a particular network device on a per-packet basis. That is to say, the Adaptive Fragmentation Procedure C 400 may be implemented each time a particular network device receives a packet for processing on a particular link or circuit.

According to the specific embodiment of FIG. 4, the network device may be configured to always enable fragmentation on selected links where fragmentation is desirable. However, in accordance with the technique of the present invention as shown, for example, in FIG. 4, the use of fragmentation on a given link may be dynamically and automatically controlled by adjusting the FRAG_SIZE value associated with that link. Thus, for example, where the value of FRAG_SIZE is set equal to the maximum packet size value or maximum transmission unit (MTU) value for a particular link, fragmentation on that link will effectively be disabled. Alternatively, where the value of FRAG_SIZE is set equal to the minimum fragment size or minimum transmission unit value on a particular link, fragmentation on that link will effectively be enabled.

It will be appreciated that the number of fragments which a packet may be fragmented into (on a particular link) is determined by the fragment size or FRAG_SIZE value associated with that link. The smaller the FRAG_SIZE value, the more fragments a packet will be fragmented into, and hence the more CPU time is required to process the packet.

As described in greater detail below, the Adaptive Fragmentation Procedure C of FIG. 4 defers from the Adaptive Fragmentation Procedure A of FIG. 2 in that it does not effectively disable fragmentation immediately when no real-time traffic has been present on a particular link for a predetermined time interval T. Rather, according to the embodiment of FIG. 4, the Adaptive Fragmentation Procedure C gradually decreases the use of fragmentation on a particular link over time so long as no real-time traffic is detected as being present on that link. According to a specific embodiment as shown, for example, in FIG. 4, the gradual decrease in the use of fragmentation on a particular link may be achieved by gradually increasing the FRAG_SIZE value on that link for each time interval that passes in which no real-time traffic is present on that link. When the FRAG_SIZE value is equal to the MTU size value of a given link, fragmentation is effectively disabled on that link.

According to a specific implementation, a separate thread of the Adaptive Fragmentation Procedure C may be implemented for each link or selected links which are handled by that network device. Further, according to a specific implementation, a separate thread of the Adaptive Fragmentation Procedure C may be implemented for each link or selected links which are handled by a given network device. For example, the Adaptive Fragmentation Procedure C may be implemented at one or more traffic handling devices (e.g., 104A, 104B, 108) which form a link or virtual link 150 between client system 102 and server system 114. In the example of FIG. 4, it is assumed that the Adaptive Fragmentation Procedure C is implemented at traffic handling device (THD) 104A (FIG. 1A), which shall be referred to as the "network device."

The specific embodiment of FIG. 4 defines a number of operating parameters which will now be described. A first parameter defines a timer interval value (i) and associated timer whose functions are similar to the timer and predetermined time interval T described previously with respect to FIG. 2 of the drawings. Another parameter defined in the embodiment of FIG. 4 is the interval count value (c). The interval count value may be used to keep track of the number of cycles completed by the timer. For example, according to a specific implementation, the timer interval value (i) may be set equal to 60 seconds. Each time the timer completes a cycle of 60 seconds, the interval count (c) is incremented. The interval count value may be tracked using a hardware or software counter which is generally known to one having ordinary skill in the art. According to a specific embodiment, the timer interval value (i) may be a predetermined value which may vary depending upon the variety of different network configuration parameters. According to at least one implementation, the timer interval value may range from a few milliseconds to several minutes or hours. Other parameters defined by the embodiment of FIG. 4 include a MIN_FRAG value which represents the minimum allowable fragmentation size on a particular link, a MAX_FRAG value which represents the maximum fragmentation size on a particular link, and a FRAG_SIZE value which is a dynamically adjustable value that represents the current fragmentation size on a particular link. According to a specific embodiment, the MIN_FRAG and MAX_FRAG values are predetermined values which are configurable by the network operator or administrator. In one implementation, the MIN_FRAG value may be set equal to the minimum transmission unit value defined by the traffic handling protocol used by the network. For example, in a conventional ATM network, the minimum transmission unit value may be defined as 2 ATM cells or 96 bytes. Accordingly, in an ATM network, the MIN_FRAG value may be set equal to 96 bytes. Further, in an ATM network the MAX_FRAG value may be set equal to 1500 bytes, which represents the MTU packet size for ATM links.

In a specific implementation, a network device which is configured to implement the Adaptive Fragmentation Procedure C of FIG. 4 may be initially configured to set the FRAG_SIZE value equal to the MIN_FRAG value, and the interval count value set equal to zero. Once initially configured, as shown in the example of FIG. 4, the network device waits (402) for a packet to be received. Upon receiving a packet, the network device then determines (404) whether the received packet is a real-time packet. If it is determined (404) that the received packet corresponds to a real-time packet, then it is desirable to keep fragmentation enabled on the link in order to control delay and delay variation for real-time traffic being carried on the link. Accordingly, the FRAG_SIZE value is set (414) equal to the MIN_FRAG value, the timer is reset (416), and the interval count (c) is set (418) equal to zero. Thereafter, the packet is processed (422) in accordance with normal traffic handling procedures. Thus, according to the embodiment of FIG. 4, whenever real-time traffic is detected on a particular link, fragmentation will effectively be enabled on a particular link by setting the FRAG_SIZE value equal to the MIN_FRAG value.

Returning to block 404 of FIG. 4, if it is determined that the received packet is a non-real time packet, then it may be desirable to reduce the amount or degree of fragmentation used on that link. Accordingly, the network device determines (406) whether the timer has expired. If it is determined that the timer has not expired, then the received packet is processed (422) in accordance with normal traffic handling procedures. If, however, it is determined that the timer has expired, the timer is reset (408), and the interval count (c) is incremented (410). Thereafter, at 412 the FRAG_SIZE value is set equal to the following expression:

$$FRAG\_SIZE = MIN\_FRAG\ value + (Scale\ Factor)*2^c, \qquad (1)$$

where the Scale Factor is a predetermined value which may be used to control how quickly fragmentation will be disabled in the absence of real-time traffic being carried on the link. Thus, for each consecutive interval (i) in which there is no real-time traffic over the link, the interval count (c) is incremented by one and the FRAG_SIZE value is recalculated according to the expression (1) defined above. According to a specific embodiment, the Scale Factor value is configurable by a network administrator, and may range, for example, from 32 to 128.

From the above expression (1) it will be appreciated that the FRAG_SIZE value will exponentially increase as the interval count value (c) is incremented. The rate at which the FRAG_SIZE value increases may be controlled by adjusting the value of the Scale Factor. According to a specific embodiment where the data network corresponds to an ATM network, the MAX_FRAG value may be set equal to 1500 bytes, and the Scale Factor value may be selected from a range of possible values such as, for example, 32–128 bytes. Further, according to a specific embodiment, the FRAG_SIZE value may never be larger than the MAX_FRAG value for a selected link. Thus, according to this embodiment, when the result of expression (1) above exceeds the MAX_FRAG value, the FRAG_SIZE value will be set equal to the MAX_FRAG value.

It will be appreciated that the adaptive fragmentation techniques described herein provide the benefit of improved performance of network devices (e.g. routers, switches, or other network devices) which are configured to implement fragmentation. In accordance with at least one embodiment of the present invention, in the absence of real-time traffic, the non-real-time traffic will not be penalized by unnecessary fragmentation, thereby resulting in a improved network performance. Whenever real-time traffic is detected, the network device may immediately enable fragmentation in order to assure the quality of real-time traffic. This feature is particularly valuable for handling VoIP traffic and Multilink PPP traffic.

It will be appreciated that if the MAX_FRAG value is set equal to the MTU size, and the FRAG_SIZE value reaches the MAX_FRAG value, then fragmentation is effectively disabled. However, the MAX_FRAG value does not necessarily have to be the same as the MTU size. For example, as described previously, the MAX_FRAG value may be determined based upon selected network configuration parameters which results in a maximum network device processing time of less than 150 milliseconds for any given packet. Further, fragmentation may be effectively enabled at all times by setting the MIN_FRAG value equal to the MAX_FRAG value.

It will further be appreciated that the adaptive fragmentation procedures A and C are based upon classification and/or analysis of packets received at a particular network device and does not require any signaling between other network components. Thus, for example, the adaptive fragmentation procedures A and C may be implemented on each of the traffic handling devices (182, 184, 186, 190) which form the link or virtual circuit between the host 193 and the client 191 of FIG. 1B.

Alternatively, the specific implementation of the Adaptive Fragmentation Procedure B of FIG. 3 is based upon reception or detection of external signals from other network devices. Thus, according to one implementation, the Adaptive Fragmentation Procedure B need only be implemented at the end or edge routers (e.g. 182, 190) of the communication link 190 connecting host 193 to client 191 (FIG. 1B). According to this implementation, the interior routers (e.g. 184, 186) need not implement the Adaptive Fragmentation Procedure B. However, according to an alternate embodiment, the Adaptive Fragmentation Procedure B may also be implemented at the interior routers (as well as the edge routers) which are part of a particular link or virtual circuit. For example, if the virtual circuit 190 of FIG. 1B is configured to utilize the RSVP protocol, it would be desirable to implement the Adaptive Fragmentation Procedure B on each of the traffic handling devices (182, 184, 186, 190) which are part of the virtual circuit 190.

Other Embodiments

Generally, the adaptive fragmentation techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the adaptive fragmentation technique of this invention may be implemented on a general-purpose programmable machine selectively activated or reconfigured by a computer program stored in memory. Such programmable machine may be a network device designed to handle network traffic, such as, for example, traffic handling device 104A of FIG. 1. Such network devices may have multiple network interfaces including frame relay and ISDN interfaces, for example. Specific examples of such network devices include routers and switches. For example, the boom server and boom client server devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the adaptive fragmentation technique of this invention may be implemented on a general-purpose network host machine such as a personal computer or workstation. Further, the invention may be at least partially implemented on a card (e.g., an interface card) for a network device or a general-purpose computing device.

Figure 5:
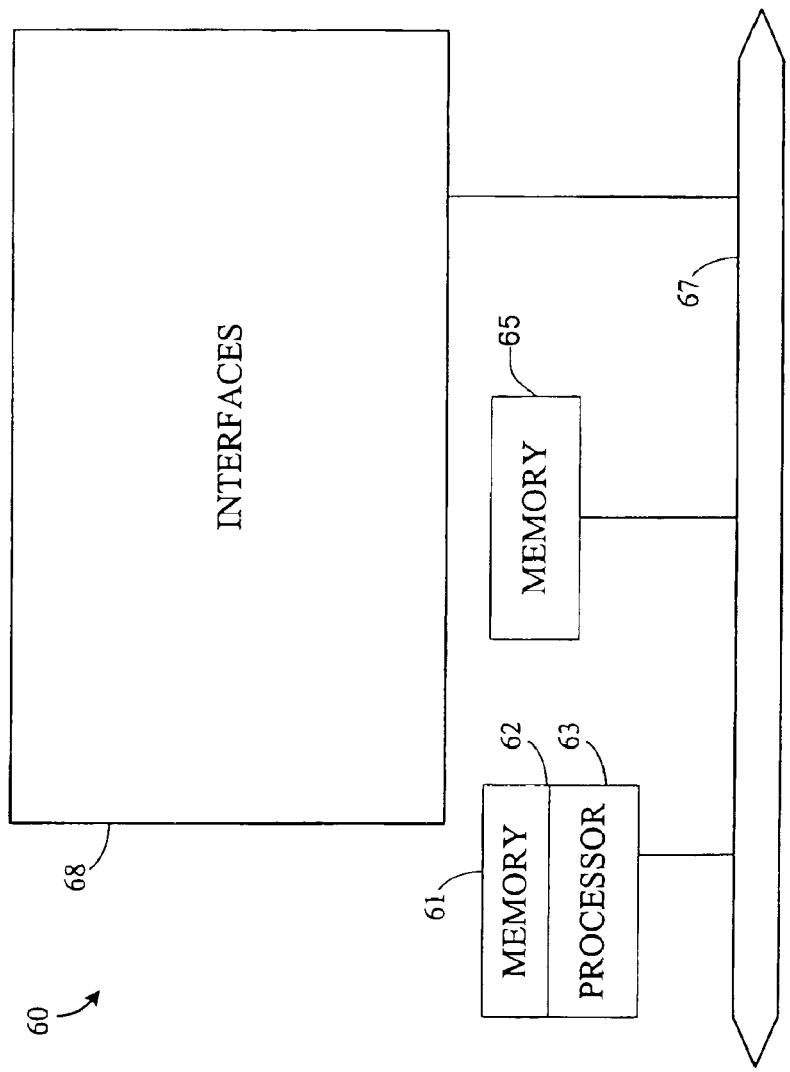
FIG. 5 shows a schematic block diagram of a network device suitable for implementing the adaptive fragmentation techniques of the present invention.

Referring now to FIG. 5, a network device 60 suitable for implementing the adaptive fragmentation techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a router or switch, the CPU 62 may be responsible for analyzing packets, encapsulating packets, forwarding packets to appropriate network devices, setting fragmentation size for selected links, maintaining interval and timer count values, detecting real-time set-up or disconnect signals, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as nonvolatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the adaptive fragmentation techniques described herein. The program instructions may control the operation of an operating system and/or one or more applications, for example. The memory or memories may also be configured to store data structures which specify fragmentation size, timer count, interval count, real-time connection count, and scale factor values for selected links of the network.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

It is claimed:

1. A method for providing adaptive fragmentation of information packets transmitted over a link of a data network, the method comprising:
   monitoring conditions on the link;
   detecting a presence of real-time traffic on the link;
   automatically enabling fragmentation on the link in response to the detection of the presence of real-time traffic on said link;
   detecting an absence of real-time traffic on the link;
   determining whether a predetermined time interval T has elapsed since detection of the absence of real-time traffic on the link; and
   automatically disabling fragmentation on the link in response to determining that the predetermined time interval T has elapsed since the detection of the absence of real-time traffic on the link.

2. The method of claim 1 further comprising using a timer to measure said predetermined time interval T.

3. The method of claim 1 further comprising:
   starting a timer in response to detecting the absence of real-time traffic on the link; and
   automatically disabling fragmentation on the link in response to detecting that the timer has expired.

4. The method of claim 3 further comprising resetting the timer in response to detecting the presence of real-time traffic on the link.

5. The method of claim 1 wherein the predetermined time interval T is a value ranging from about 60 seconds to about 180 seconds.

6. The method of claim 1 further comprising:
   detecting an external signal from a first network device; and
   determining whether the external signal is related to a real-time set-up signal for establishing at least one real-time connection on the link.

7. The method of claim 1, wherein the link includes at least one network device, and the network device is configured to transmit information over the link using a Frame Relay protocol.

8. The method of claim 1, wherein the link includes at least one network device, and the network device is configured to transmit information over the link using a PPP multilink protocol.

9. The method of claim 1, wherein the link includes at least one network device, and the network device is configured to transmit information over the link using an ATM protocol.

10. A method for providing adaptive fragmentation of information packets transmitted over a link of a data network, the method comprising:
    configuring the link to include a dynamically adjustable FRAG_SIZE value relating to a fragmentation size for packets carried on the link such that fragmentation will be performed on selected packets which have a size greater than the FRAG_SIZE value; and
    dynamically increasing the FRAG_SIZE value on the link over a given time period in response to detecting the absence of real-time traffic on the link during the given time period.

11. The method of claim 10 further comprising dynamically decreasing the FRAG_SIZE value on the link in response to detecting the presence of real-time traffic on the link.

12. The method of claim 10 further comprising dynamically decreasing the FRAG_SIZE value in response detecting the presence of real-time traffic on the link to thereby cause fragmentation to effectively be enabled on the link.

13. The method of claim 10 further comprising continually increasing the FRAG_SIZE value on the link over a continuous time period in response to detecting the absence of real-time traffic on the link during the time period.

14. The method of claim 10 further comprising limiting the increase of FRAG_SIZE value to a maximum predetermined value which represents a maximum transmission unit size of packets to be carried over the link, thereby effectively disabling fragmentation on the link.

15. The method of claim 10 wherein the FRAG_SIZE value is increased substantially linearly over time in response to no real-time traffic being detected on the link.

16. The method of claim 10 wherein the FRAG_SIZE value is increased substantially exponentially over time in response to no real-time traffic being detected on the link.

17. A computer program product for providing adaptive fragmentation of information packets transmitted over a link of a data network, the computer program product comprising:
    a computer usable medium having computer readable code embodied therein, the computer readable code comprising:
    computer code for monitoring conditions on the link;

computer code for detecting a presence of real-time traffic on the link;

computer code for automatically enabling fragmentation on the link in response to the detection of the presence of real-time traffic on said link;

computer code for detecting an absence of real-time traffic on the link;

computer code for determining whether a predetermined time interval T has elapsed since detection of the absence of real-time traffic on the link; and computer code for automatically disabling fragmentation on the link in response to determining that the predetermined time interval T has elapsed since the detection of the absence of real-time traffic on the link.

18. The computer program product of claim 17 further comprising computer code for using a timer to measure said predetermined time interval T.

19. The computer program product of claim 17 further comprising:

computer code for starting a timer in response to detecting the absence of real-time traffic on the link; and computer code for automatically disabling fragmentation on the link in response to detecting that the timer has expired.

20. The computer program product of claim 19 further comprising computer code for resetting the timer in response to detecting the presence of real-time traffic on the link.

21. The computer program product of claim 17 wherein the predetermined time interval T is a value ranging from about 60 seconds to about 180 seconds.

22. The computer program product of claim 17 further comprising:

computer code for detecting an external signal from a first network device; and computer code for determining whether the external signal is related to a real-time set-up signal for establishing at least one real-time connection on the link.

23. The computer program product of claim 17, wherein the link includes at least one network device, and the network device is configured to transmit information over the link using a Frame Relay protocol.

24. The computer program product of claim 17, wherein the link includes at least one network device, and the network device is configured to transmit information over the link using a PPP multilink protocol.

25. The computer program product of claim 17, wherein the link includes at least one network device, and the network device is configured to transmit information over the link using an ATM protocol.

26. A computer program product for providing adaptive fragmentation of information packets transmitted over a link of a data network, the computer program product comprising:

computer code for configuring the link to include a dynamically adjustable FRAG_SIZE value relating to a fragmentation size for packets carried on the link such that fragmentation will be performed on selected packets which have a size greater than the FRAG_SIZE value; and computer code for dynamically increasing the FRAG_SIZE value on the link over a given time period in response to detecting the absence of real-time traffic on the link during the given time period.

27. The computer program product of claim 26 further comprising computer code for dynamically decreasing the FRAG_SIZE value on the link in response to detecting the presence of real-time traffic on the link.

28. The computer program product of claim 26 further comprising computer code for dynamically decreasing the FRAG_SIZE value in response detecting the presence of real-time traffic on the link to thereby cause fragmentation to effectively be enabled on the link.

29. The computer program product of claim 26 further comprising computer code for continually increasing the FRAG_SIZE value on the link over a continuous time period in response to detecting the absence of real-time traffic on the link during the time period.

30. The computer program product of claim 26 further comprising computer code for limiting the increase of FRAG_SIZE value to a maximum predetermined value which represents a maximum transmission unit size of packets to be carried over the link, thereby effectively disabling fragmentation on the link.

31. The computer program product of claim 26 wherein the FRAG_SIZE value is increased substantially linearly over time in response to no real-time traffic being detected on the link.

32. The computer program product of claim 26 wherein the FRAG_SIZE value is increased substantially exponentially over time in response to no real-time traffic being detected on the link.

33. A system for providing adaptive fragmentation of information packets transmitted over a link of a data network, the system comprising:

means for monitoring conditions on the link;

means for detecting a presence of real-time traffic on the link;

means for automatically enabling fragmentation on the link in response to the detection of the presence of real-time traffic on said link;

means for detecting an absence of real-time traffic on the link;

means for determining whether a predetermined time interval T has elapsed since detection of the absence of real-time traffic on the link; and means for automatically disabling fragmentation on the link in response to determining that the predetermined time interval T has elapsed since the detection of the absence of real-time traffic on the link.

34. The system of claim 33 further comprising means for using a timer to measure said predetermined time interval T.

35. The system of claim 33 further comprising:

means for starting a timer in response to detecting the absence of real-time traffic on the link; and means for automatically disabling fragmentation on the link in response to detecting that the timer has expired.

36. The system of claim 35 further comprising means for resetting the timer in response to detecting the presence of real-time traffic on the link.

37. The system of claim 33 wherein the predetermined time interval T is a value ranging from about 60 seconds to about 180 seconds.

38. The system of claim 33 further comprising:

means for detecting an external signal from a first network device; and means for determining whether the external signal is related to a real-time set-up signal for establishing at least one real-time connection on the link.

39. The system of claim 33, wherein the link includes at least one network device, and the network device is configured to transmit information over the link using a Frame Relay protocol.

40. The system of claim 33, wherein the link includes at least one network device, and the network device is configured to transmit information over the link using a PPP multilink protocol.

41. The system of claim 33, wherein the link includes at least one network device, and the network device is configured to transmit information over the link using an ATM protocol.

42. A system for providing adaptive fragmentation of information packets transmitted over a link of a data network, the system comprising:
   means for configuring the link to include a dynamically adjustable FRAG_SIZE value relating to a fragmentation size for packets carried on the link such that fragmentation will be performed on selected packets which have a size greater than the FRAG_SIZE value; and
   means for dynamically increasing the FRAG_SIZE value on the link over a given time period in response to detecting the absence of real-time traffic on the link during the given time period.

43. The system of claim 42 further comprising means for dynamically decreasing the FRAG_SIZE value on the link in response to detecting the presence of real-time traffic on the link.

44. The system of claim 42 further comprising means for dynamically decreasing the FRAG_SIZE value in response detecting the presence of real-time traffic on the link to thereby cause fragmentation to effectively be enabled on the link.

45. The system of claim 42 further comprising means for continually increasing the FRAG_SIZE value on the link over a continuous time period in response to detecting the absence of real-time traffic on the link during the time period.

46. The system of claim 42 further comprising means for limiting the increase of FRAG_SIZE value to a maximum predetermined value which represents a maximum transmission unit size of packets to be carried over the link, thereby effectively disabling fragmentation on the link.

47. The system of claim 42 wherein the FRAG_SIZE value is increased substantially linearly over time in response to no real-time traffic being detected on the link.

48. The system of claim 42 wherein the FRAG_SIZE value is increased substantially exponentially over time in response to no real-time traffic being detected on the link.

49. A system for providing adaptive fragmentation of information packets transmitted over a link of a data network, the system comprising:
   at least one processor;
   at least one interface configured or designed to provide a communication link to at least one other network device in the data network; and
   memory;
   the system being configured or designed to monitor conditions on the link;
   the system being further configured or designed to detecting a presence of real-time traffic on the link;
   the system being further configured or designed to automatically enable fragmentation on the link in response to the detection of the presence of real-time traffic on said link;
   the system being further configured or designed to detecting an absence of real-time traffic on the link;
   the system being further configured or designed to determining whether a predetermined time interval T has elapsed since detection of the absence of real-time traffic on the link; and
   the system being further configured or designed to automatically disable fragmentation on the link in response to determining that the predetermined time interval T has elapsed since the detection of the absence of real-time traffic on the link.

50. The system of claim 49 further comprising a timer configured or designed to measure said predetermined time interval T.

51. The system of claim 50 being further configured or designed to:
   start the timer in response to detecting the absence of real-time traffic on the link; and
   automatically disable fragmentation on the link in response to detecting that the timer has expired.

52. The system of claim 51 being further configured or designed to reset the timer in response to detecting the presence of real-time traffic on the link.

53. The system of claim 49 wherein the predetermined time interval T is a value ranging from about 60 seconds to about 1.80 seconds.

54. The system of claim 49 being further configured or designed to:
   detect an external signal from a first network device; and
   determine whether the external signal is related to a real-time set-up signal for establishing at least one real-time connection on the link.

55. The system of claim 49 further comprising at least one network device configured or designed to transmit information over the link using a Frame Relay protocol.

56. The system of claim 49, further comprising at least one network device configured or designed to transmit information over the link using a PPP multilink protocol.

57. The system of claim 49, further comprising at least one network device configured or designed to transmit information over the link using an ATM protocol.

58. A system for providing adaptive fragmentation of information packets transmitted over a link of a data network, the system comprising:
   at least one processor;
   at least one interface configured or designed to provide a communication link to at least one other network device in the data network; and
   memory;
   the system being configured or designed to configure the link to include a dynamically adjustable FRAG_SIZE value relating to a fragmentation size for packets carried on the link such that fragmentation will be performed on selected packets which have a size greater than the FRAG_SIZE value; and
   the system being further configured or designed to dynamically increase the FRAG_SIZE value on the link over a given time period in response to detecting the absence of real-time traffic on the link during the given time period.

59. The system of claim 58 being further configured or designed to dynamically decrease the FRAG_SIZE value on the link in response to detecting the presence of real-time traffic on the link.

60. The system of claim 58 being further configured or designed to dynamically decrease the FRAG_SIZE value in response detecting the presence of real-time traffic on the link to thereby cause fragmentation to effectively be enabled on the link.

61. The system of claim 58 being further configured or designed to continually increase the FRAG_SIZE value on the link over a continuous time period in response to detecting the absence of real-time traffic on the link during the time period.

62. The system of claim 58 being further configured or designed to limit the increase of FRAG_SIZE value to a maximum predetermined value which represents a maximum transmission unit size of packets to be carried over the link, thereby effectively disabling fragmentation on the link.

63. The system of claim 58 wherein the FRAG_SIZE value is increased substantially linearly over time in response to no real-time traffic being detected on the link.

64. The system of claim 58 wherein the FRAG_SIZE value is increased substantially exponentially over time in response to no real-time traffic being detected on the link.

* * * * *